United States Patent
Comi et al.

(10) Patent No.: US 9,389,077 B2
(45) Date of Patent: Jul. 12, 2016

(54) ACCELERATION AND ANGULAR VELOCITY RESONANT DETECTION INTEGRATED STRUCTURE, AND RELATED MEMS SENSOR DEVICE

(71) Applicant: STMicroelectronics S.r.l., Agrate Brianza (IT)

(72) Inventors: Claudia Comi, Milan (IT); Alberto Corigliano, Milan (IT); Leonardo Baldasarre, Abbiategrasso (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 280 days.

(21) Appl. No.: 14/032,052

(22) Filed: Sep. 19, 2013

(65) Prior Publication Data
US 2014/0090469 A1    Apr. 3, 2014

(30) Foreign Application Priority Data

Sep. 28, 2012   (IT) .............................. TO2012A0855

(51) Int. Cl.
*G01C 19/56*     (2012.01)
*G01P 15/097*    (2006.01)
*G01P 15/125*    (2006.01)
(Continued)

(52) U.S. Cl.
CPC .............. *G01C 19/56* (2013.01); *G01C 19/574* (2013.01); *G01P 15/097* (2013.01); *G01P 15/125* (2013.01); *G01P 2015/0831* (2013.01)

(58) Field of Classification Search
CPC ................................................... D01C 19/574
USPC .......................................... 73/504.04, 504.12
See application file for complete search history.

(56) References Cited

U.S. PATENT DOCUMENTS

| 2004/0211258 A1 | 10/2004 | Geen |
| 2010/0089157 A1 | 4/2010 | Quer et al. |
| 2011/0056294 A1 | 3/2011 | Simoni et al. |

FOREIGN PATENT DOCUMENTS

WO    2013/030798 A1    3/2013

OTHER PUBLICATIONS

Lee, B. et al., "A Vacuum Packaged Differential Resonant Accelerometer Using Gap Sensitive Electrostatic Stiffness Changing Effect", Proceedings / MEMS 200, The Thirteenth Annual International Conference on Micro Electro Mechanical Systems, Miyazaki, Japan, Jan. 23-27, 2000, IEEE Service Center, Piscataway, NJ, pp. 352-357, XP002672824.

(Continued)

*Primary Examiner* — John Chapman, Jr.
(74) *Attorney, Agent, or Firm* — Seed Intellectual Property Law Group PLLC

(57) ABSTRACT

An integrated detection structure has a first inertial mass and a second inertial mass, each of which is elastically anchored to a substrate and has a linear movement along a first horizontal axis, a first detection movement of rotation about a first axis of rotation parallel to a second horizontal axis and a second detection movement of translation along the second horizontal axis; driving electrodes cause linear movement of the inertial masses, in opposite directions of the first horizontal axis; a pair of flexural resonator elements and a pair of torsional resonator elements are elastically coupled to the inertial masses, the torsional resonator elements having a resonant movement of rotation about a second axis of rotation and a third axis of rotation, parallel to one another and to the first axis of rotation.

18 Claims, 7 Drawing Sheets

(51) Int. Cl.
*G01C 19/574* (2012.01)
*G01P 15/08* (2006.01)

(56) References Cited

OTHER PUBLICATIONS

Burns et al., "Resonant Microbeam Accelerometers," 8th International Conference on Solid-State Sensors and Actuators, and Eurosensors IX. Stockholm, Sweden, Jun. 25-29, 1995, pp. 659-662.
Kim et al., "Inertial-Grade Out-of-Plane and In-Plane Differential Resonant Silicon Accelerometers (DRXLs)," 13th International Conference on Solid-State Sensors, Actuators and Microsystems, Seoul, Korea, Jun. 5-9, 2005, pp. 172-175.
Li et al., "Structure design and fabrication of a novel dual-mass resonant output micromechanical gyroscope," *Microsyst Technol* 16:543-552, 2010.
Seshia et al., "An Integrated Microelectromechanical Resonant Output Gyroscope," Fifteenth IEEE International Conference on Micro Electro Mechanical Systems, Las Vegas, NV, Jan. 24, 2002, pp. 722-726.
Zhu et al., "A Novel Resonant Accelerometer Based on Nanoelectromechanical Oscillator," 2010 IEEE 23rd International Conference on Micro Electro Mechanical Systems (MEMS), Wanchai, Hong Kong, Jan. 24-28, 2010, pp. 440-443.
Comi et al., "A resonant micro-accelerometer with high sensitivity operating in an oscillating circuit," *Journal of Microelectromechanical Systems* 19(5): 1140-1152, Oct. 2010.
Comi et al., "A new out-of-plane resonant micro accelerometer," *Proc Aimeta* 2(15): 7 pages, Sep. 2011.
Dau et al., "Design and fabrication of convective inertial sensor consisting of 3DOF gyroscope and 2DOF accelerometer," *Transducers*, 1170-1173, Jun. 21-25, 2009.

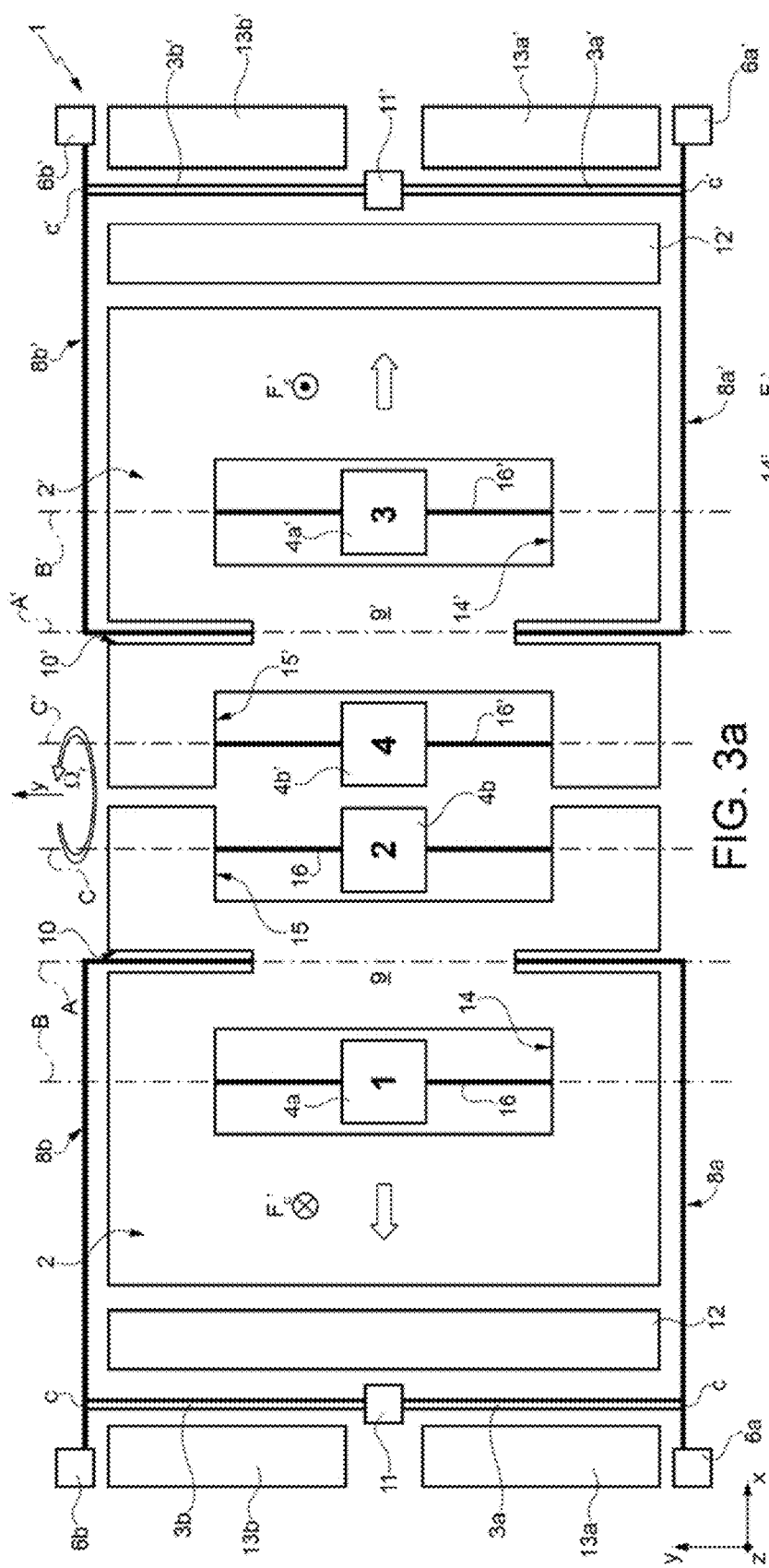
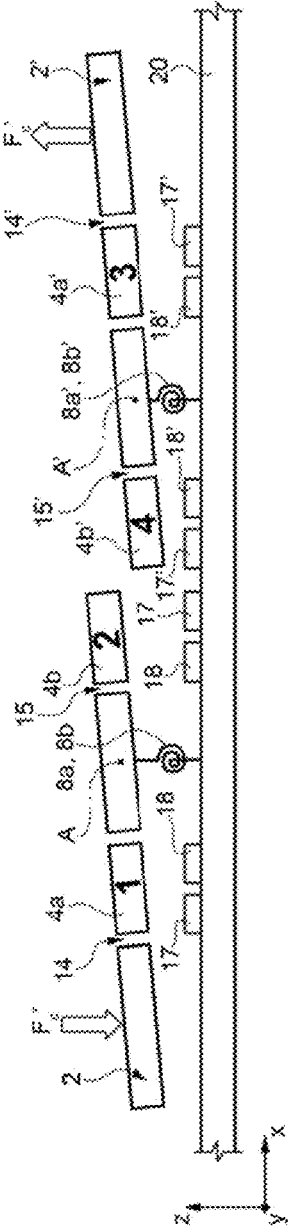

ACCELERATION AND ANGULAR VELOCITY RESONANT DETECTION INTEGRATED STRUCTURE, AND RELATED MEMS SENSOR DEVICE

BACKGROUND

1. Technical Field

The present disclosure relates to an acceleration and angular-velocity resonant detection integrated structure, and to a related sensor device of a so-called MEMS (microlectromechanical system) type.

2. Description of the Related Art

As is known, MEMS accelerometers and gyroscopes have been proposed and are used, thanks to their high compactness, their reduced levels of consumption, and their good electrical performance, in a wide range of contexts of application, for example in the field of portable electronic apparatuses, for inertial navigation applications, for creating user interfaces, or in general for detecting displacements in a three-dimensional space.

In particular, resonant micro-sensors have been proposed, made with the surface-micromachining technique, which base detection of external quantities on the variation of frequency of one or more elements set in resonance. Resonant detection, as compared to other measuring techniques, has the advantage of affording a direct frequency output, of a quasi-digital type, high sensitivity and a wide dynamic range.

In resonant accelerometers, the external acceleration to be measured produces a detectable shift of the resonance frequency of one or more resonator elements of the integrated mechanical detection structure. The resonator element may be constituted by an entire inertial mass (test mass or free mass, the so-called "proof mass") of the integrated detection structure, by some part thereof, or by a distinct element, coupled to the inertial mass.

According to the configuration of the integrated detection structure, the variation of the resonance frequency may be induced by the presence, upon displacement of the inertial mass, of axial stresses in the resonator element, or of variations of the so-called "electrical stiffness" to which the same resonator element is subjected.

Resonant accelerometers, the operating principle of which is based on the detection of a variation of the resonance frequency due to axial stresses in the resonator element, are, for example, described in the following documents:

D. W. Bruns, R. D. Horning, W. R. Herb, J. D. Zook, H. Guckel "Resonant microbeam accelerometers", Proc. Transducers 95, Stockholm, Sweden, June 25-29, 659-662 (1995); and R. Zhu, G. Zhang, G. Chen "A novel resonant accelerometer based on nanoelectromechanical oscillator", Proc. MEMS 2010, Hong Kong, 440-443 (2010).

Resonant accelerometers, the operating principle of which is, instead, based upon the detection of a variation of the resonance frequency due to a variation of electrical stiffness, are described, for example, in the following documents:

B. Lee, C. Oh, S. Lee, Y. Oh, K. Chun, "A vacuum packaged differential resonant accelerometer using gap sensitive electrostatic stiffness changing effect", Proc. MEMS 2000; and H. C. Kim, S. Seok, I. Kim, S-D. Choi, K. Chun, "Inertial-grade out-of-plane and in-plane differential resonant silicon accelerometers (DRXLs)", Proc. Transducers '05, Seoul, Korea, June 5-9, 172-175 (2005).

Moreover, in Patent No. IT 1 395 419 and in Italian patent application No. TO2011A000782 filed on Aug. 31, 2011 (related to WO2013030798), in the name of the present Applicants, resonant accelerometers that are improved as regards the characteristics (in particular the sensitivity) and the reduced mechanical dimensions are described.

In gyroscopes, generally, an inertial mass is made to vibrate at the natural resonance frequency and the effect due to the Coriolis force that originates on one or more detection elements in the presence of an external angular velocity is measured.

In general, the detection is made by means of the capacitive technique, while there exist a few examples of microgyroscopes with resonant detection, amongst which may the following documents may be cited, as examples:

A. A. Seshia, R. T. Howe, S. Montague, "An integrated microelectromechanical resonant output gyroscope", Proc. MEMS2002, 722-726 (2002);

J. Li, J. Fang, H. Dong, Y. Tao, "Structure design and fabrication of a novel dual-mass resonant output micromechanical gyroscope", Microsyst. Technology, 16, 543-552.

In these documents, the Coriolis force generates axial stresses in resonator elements, which modify their resonance frequency accordingly, enabling detection of the angular velocity.

BRIEF SUMMARY

To the knowledge of the present Applicants, micro-gyroscopes that base their principle of detection on a variation of resonance frequency due to a variation of electrical stiffness have not yet been developed.

The trend is moreover known, aimed at the reduction of the dimensions and at the optimization of space occupation, in particular in portable apparatuses, towards integration of a number of detection structures within one and the same integrated device (the so-called "chip"); for example, detection structures with a number of measurement axes, or else acceleration detection structures integrated with angular-velocity detection structures.

However, up to now, these integrated detection structures typically have a certain number of distinct inertial masses for detecting the various external quantities (accelerations and/or angular velocities corresponding to respective measurement axes), and moreover distinct reading elements and circuits.

In general, there is a desire to optimize these integrated detection structures, in particular as regards the electrical characteristics and the mechanical dimensions, mainly in the case of portable applications in which low levels of consumption and reduced dimensions are desired.

According to one embodiment of the present disclosure, an acceleration and angular-velocity resonant integrated detection structure, and a corresponding sensor device are provided.

In one embodiment, an integrated detection structure comprises a substrate, elastic anchorage elements, and a first inertial mass and a second inertial mass. Each inertial mass is suspended over the substrate in a plane and anchored to the substrate by respective ones of the elastic anchorage elements. The elastic anchorage elements are configured to allow the respective inertial mass to perform a linear driving movement along a first axis in said plane and a respective first detection movement of rotation about a respective first axis of rotation parallel to a second axis in said plane, transverse to said first axis. The structure further includes a first set of driving electrodes operatively coupled to each of said first and second inertial masses and configured to drive the first and second inertial masses with driving movements, in opposite directions along said first axis. The structure further includes elastic supporting elements, and a pair of first resonator elements elastically coupled to each of said first and second inertial masses via respective ones of the elastic supporting elements. The respective elastic supporting elements are configured to couple said pairs of first resonator elements to the respective one of said first and second inertial masses during the respective first detection movement of rotation and enable an independent resonant movement of the pair of first resonator elements. The respective first detection movement of said first inertial mass or second inertial mass is a function of the presence of a first angular velocity or of a first linear acceleration to be detected and causes corresponding variations of resonance frequency of said first resonator elements.

BRIEF DESCRIPTION OF THE SEVERAL VIEWS OF THE DRAWINGS

For a better understanding of the present disclosure, preferred embodiments thereof are now described, purely by way of non-limiting examples and with reference to the attached drawings, wherein:

FIG. 1a is a schematic plan view of an integrated detection structure, according to one embodiment of the present disclosure;

FIG. 1b is a schematic lateral cross-sectional view of a portion of the integrated detection structure of FIG. 1a;

FIGS. 3a-3b show, in plan view and, respectively, in lateral section, the integrated detection structure in an operating condition of detection of an angular velocity of roll;

DETAILED DESCRIPTION

Figure 1:
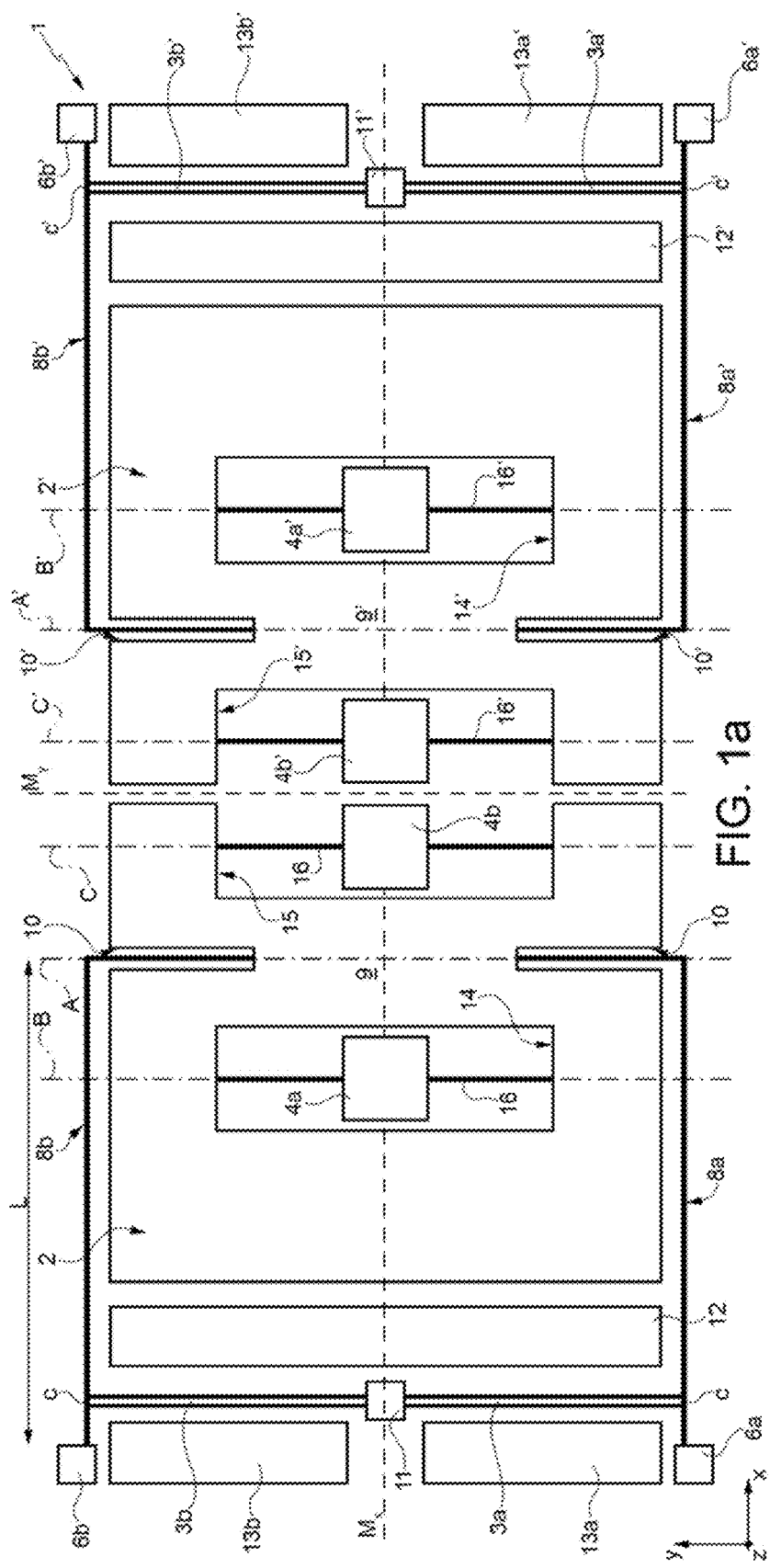

FIG. 1a shows a detection structure, of a microelectromechanical type, designated as a whole by 1, for integrated detection of acceleration and angular velocity. The integrated detection structure 1 may be made with the techniques of surface micromachining of semiconductors, in particular starting from a body of semiconductor material (such as silicon).

The integrated detection structure 1 comprises a single pair of inertial masses constituted by a first inertial mass 2 and by a second inertial mass 2', coupled to each of which is a respective pair of flexural resonator elements 3a-3b, 3a'-3b' and a respective pair of torsional resonator elements 4a-4b, 4a'-4b' (it may be noted that in FIG. 1a, as likewise in the following figures, the prime sign indicates elements associated to the second inertial mass 2').

The integrated detection structure 1 has a main extension in a horizontal plane xy, defined by a first axis x and by a second axis y, and a substantially negligible size (as compared to the size in the horizontal plane xy) in a direction orthogonal to the horizontal plane xy, along a vertical axis z, which defines a set of three orthogonal axes with the aforesaid first and second axes x, y in the horizontal plane.

The integrated detection structure 1 is moreover perfectly symmetrical with respect to a first median axis $M_x$ and to a second median axis $M_y$, passing through its geometrical center and parallel, respectively, to the first and second axes x, y.

Given the symmetry of the structure, the inertial masses 2, 2' and the associated resonator elements are configured in a specular way, so that the following description will discuss in detail only a first of the two inertial masses, in particular the first inertial mass 2, it being evident that altogether similar considerations apply also in the case of the second of the two inertial masses, in this case the second inertial mass 2'.

In detail, the first inertial mass 2 is anchored to an underlying substrate (here not illustrated, for example a substrate of semiconductor material, such as silicon) so as to be suspended above the substrate, with the horizontal plane xy substantially parallel to a top surface thereof, in the resting condition (i.e., in the absence of external quantities to be detected).

In particular, the first inertial mass 2 is elastically coupled to a pair of external anchorages 6a, 6b, set externally with respect to the overall dimensions of the first inertial mass 2 in the horizontal plane xy, laterally at a certain distance along the first axis x and the second axis y in the horizontal plane xy. The external anchorages 6a, 6b are, for example, constituted by a respective pillar that extends vertically as far as the substrate, and is mechanically connected thereto, and are set symmetrically with respect to the first median axis $M_x$.

The first inertial mass 2 is connected to each external anchorage 6a, 6b by means of a respective elastic element (or spring) 8a, 8b, for example, of the rectilinear or folded type; the elastic anchorage elements 8a, 8b are arranged symmetrically with respect to the first median axis $M_x$.

In particular, each elastic element 8a, 8b has a first end anchored (constrained, or integral with respect) to a respective external anchorage 6a, 6b, and a second end anchored (constrained, or integral with respect) to an internal portion 9 of the first inertial mass 2 set in a position corresponding to the first median axis $M_x$. Each elastic element 8a, 8b has a first spring portion, which extends longitudinally parallel to the first axis x and is set laterally alongside the first inertial mass 2, and is associated to the aforesaid first end, and a second spring portion, which extends longitudinally parallel to the second axis y and is set at right angles with respect to the first portion, to form an "L", and is associated to the aforesaid second end. The second spring portion extends within the first inertial mass 2, in a respective recess 10, which traverses the first inertial mass 2 throughout its thickness.

The first inertial mass 2 has an asymmetrical distribution of mass along the first axis x with respect to the second spring portions of the elastic anchorage elements 8a, 8b, and is constrained in an eccentric way to the external anchorages 6a, 6b.

The elastic anchorage elements 8a, 8b are as a whole configured (in particular, in terms of flexural and torsional stiffness) so as to maintain the first inertial mass 2 suspended above the substrate, and in such a way that: the first natural mode of the first inertial mass 2 is a translation along the second axis y; the second natural mode is a rotation out of the horizontal plane xy, about a first axis of rotation A, parallel to the second axis y, which traverses the aforesaid internal portion 9 and is defined by the axis of longitudinal extension of the second spring portions; and the third natural mode is a translation along the first axis x.

The flexural resonator elements 3a, 3b associated to the first inertial mass 2, are of the beam type, very thin (i.e., with a width much smaller than their length), extend longitudinally in a direction parallel to the second axis y, and are set alongside the first inertial mass 2 with respect to the first axis x.

In particular, each flexural resonator element 3a, 3b is constrained to the substrate at a first longitudinal end, by means of a central anchorage 11, common to both elements and set in a position corresponding to the first median axis $M_x$. Each flexural resonator element 3a, 3b is moreover constrained, at its second longitudinal end, to a respective elastic element 8a, 8b, in particular to the corresponding first portion of the same elastic element 8a, 8b, in strict proximity of the corresponding external anchorage 6a, 6b. The flexural resonator elements 3a, 3b hence extend from the point of constraint with the respective elastic element 8a, 8b to the central anchorage 11, and are coupled to the first inertial mass 2 via the same elastic element 8a, 8b.

In particular, the distance, designated by c, between the point of constraint of the flexural resonator elements 3a, 3b to the respective elastic element 8a, 8b and the respective external anchorage 6a, 6b is much smaller than the length L of the first portion of the elastic element 8a, 8b itself; for example, the following relation is satisfied $$0.01 \cdot L < c < 0.1 \cdot L \quad (1)$$

As described in detail in the aforesaid Patent No. IT 1 395 419, the position of constraint of the flexural resonator elements 3a, 3b (very close to the external anchorage 6a, 6b) is chosen so as to maximize the axial stresses in the resonator elements due to a translation of the inertial mass along the second axis y (as described in greater detail hereinafter); there is thus obtained a high factor of amplification of force without resorting to lever systems.

Resonant driving of the flexural resonator elements 3a, 3b and detection of the resulting electrical resonance signals occur by capacitive coupling with electrodes set parallel thereto and facing them.

In particular, a driving electrode 12 is present, common to both of the flexural resonator elements 3a, 3b, which has an extension along the second axis y substantially coinciding with the corresponding extension of the first inertial mass 2, and is set, along the first axis x, between the flexural resonator elements 3a, 3b and the first inertial mass 2. A respective detection electrode 13a, 13b is moreover present, for each flexural resonator element 3a, 3b, facing it on the opposite side of the first axis x with respect to the driving electrode 12, set along the second axis y between the respective external anchorage 6a, 6b and the central anchorage 11.

As will be clarified hereinafter, the driving electrode 12 is moreover functionally coupled to the first inertial mass 2, for causing driving thereof in the resonance condition, in a linear direction, along the first axis x.

The torsional resonator elements 4a-4b are constituted by respective suspended masses, which have dimensions much smaller than the first inertial mass 2 in the horizontal plane xy and a square (or generically rectangular) shape in plan view, and are arranged on opposite sides of the internal portion 9 of the first inertial mass 2 with respect to the first axis of rotation A, symmetrically with respect to the same first axis of rotation A.

In particular, a first torsional resonator element 4a of the pair is set inside the first inertial mass 2, within a first opening 14, provided through a first portion of the first inertial mass 2 (as it is divided by the internal portion 9) having the greater extension along the first axis x, whereas a second torsional resonator element 4b of the pair is set at a lateral position with respect to the first inertial mass 2, within a second opening 15, provided through the second portion of the first inertial mass 2 having the smaller extension along the first axis x than the first portion of the first inertial mass and arranged at the center of symmetry of the entire integrated detection structure 1.

In particular, the second torsional resonator element 4b is located at a maximum distance possible from the first axis of rotation A, such that an external lateral surface thereof is flush with and aligned to, along the second axis y, a respective lateral surface of the first inertial mass 2. The second opening 15 is open towards the outside of the first inertial mass 2, at the aforesaid lateral surface.

As described in detail in the aforesaid Patent application No. TO2011A000782 (WO2013030798), this position of the torsional resonator elements 4a, 4b enables maximization of the sensitivity of detection, maintaining extremely small overall dimensions.

The torsional resonator elements 4a, 4b are elastically constrained to the first inertial mass 2 by respective elastic supporting elements 16, of a torsional type, configured so as to allow the torsional resonator elements 4a, 4b to perform a movement of rotation out of the horizontal plane xy, about a respective second axis of rotation B and third axis of rotation C, which are parallel to the first axis of rotation A and to the second axis y; this movement constitutes the first natural mode for the torsional resonator elements 4a, 4b. The axes of rotation B, C are arranged on opposite sides of the first axis of rotation A, symmetrically thereto.

In greater detail, each torsional resonator element 4a, 4b is constrained to the respective portion of the first inertial mass 2 by a pair of elastic supporting elements 16, constituted by torsional springs of a rectilinear or folded type, which extend generally along the second axis y, on opposite sides of the respective torsional resonator element 4a, 4b, substantially centrally with respect thereto.

With reference again to FIG. 1b, for each torsional resonator element 4a, 4b a respective pair of electrodes is provided, and in particular a driving electrode 17 and a detection electrode 18, arranged underneath the torsional resonator element 4a, 4b, on opposite sides with respect to the corresponding axis of rotation B, C; the electrodes 17 and 18 are set on the substrate of the integrated detection structure 1, designated by 20 in FIG. 1b.

The driving electrode 17 is used for driving the associated torsional resonator element 4a, 4b in a condition of resonance, in a rotation about the respective axis of rotation B, C, by applying an appropriate electrical potential difference, and is set at a more external lateral position with respect to the first axis of rotation A and to the overall dimensions of the first inertial mass 2 in the horizontal plane xy. The detection electrode 18 is, instead, used for detecting, by means of a variation of the capacitive coupling with the corresponding torsional resonator element 4a, 4b, variations of the corresponding resonance frequency (according to a detection scheme known as "parallel plate").

In a way not illustrated, appropriate electrical-connection paths are provided for electrical connection of the aforesaid electrodes 17, 18 to an electronic circuit coupled to the integrated detection structure 1. The electronic circuit is configured to supply the electrical driving signals to the integrated detection structure 1, and to receive and process the electrical detection signals supplied by the same integrated detection structure 1.

A description is now made of the operating principle of the integrated detection structure 1, which enables integrated detection of angular velocities about two angular-velocity detection axes and linear accelerations along two acceleration detection axes.

In particular, by means of the flexural resonator elements 3a-3b, 3a'-3b', the integrated detection structure 1 enables differential detection of an angular velocity acting about a direction out of the horizontal plane xy (in particular along the vertical axis z), the so-called yaw angular velocity $\Omega_z$, and of a linear acceleration $a_y$ along the second axis y. In addition, by means of the torsional resonator elements 4a-4b, 4a'-4b', the integrated detection structure 1 enables differential detection of an angular velocity acting about the second axis y, the so-called roll angular velocity $\Omega_r$, and of a linear out-of-plane acceleration $a_z$ (acting along the vertical axis z).

Figure 2:
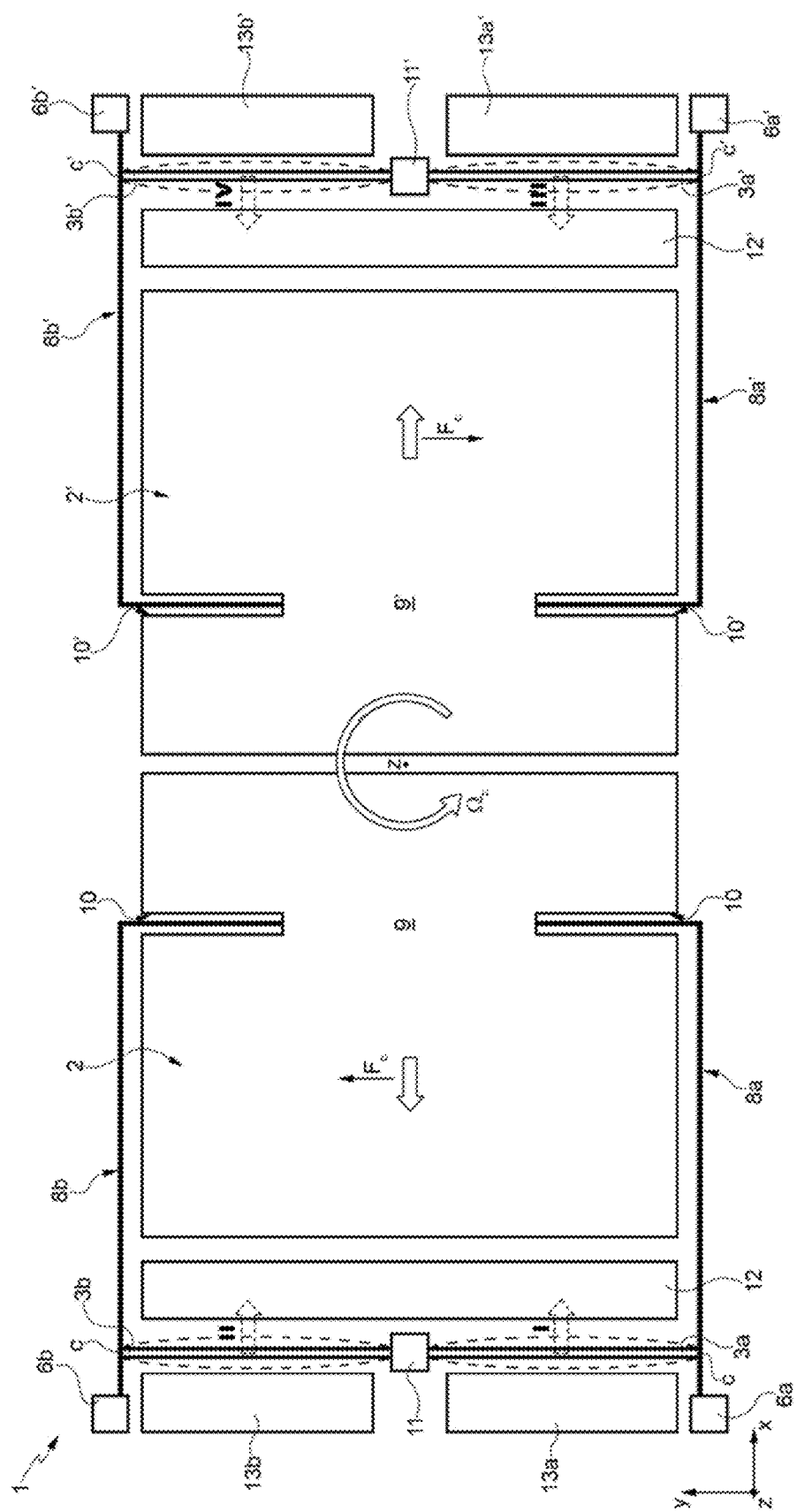
FIG. 2 shows a simplified plan view of the integrated detection structure in an operating condition of detection of an angular velocity of yaw.

In detail, and with reference to FIG. 2 (in which, for simplicity of illustration the torsional resonator elements 4a-4b, 4a'-4b' are not represented), to detect the yaw angular velocity $\Omega_z$, acting about the vertical axis z, the inertial masses 2, 2' are kept in resonance according to the third natural mode of motion (i.e., the translation along the first axis x), by means of electrostatic driving implemented by the respective driving electrodes 12, 12' (in the direction of the arrow represented with a solid line).

When an external yaw angular velocity $\Omega_z$ is applied, on the two inertial masses 2, 2' respective Coriolis forces $F_c$ originate directed along the second axis y, having opposite directions and with the modulus given by $$F_c = 2 \cdot m \cdot \Omega_z \cdot \dot{x} \tag{2}$$

where $\dot{x}$ is the linear velocity of the inertial masses 2, 2' along the first axis x, due to resonant driving and m is their mass.

The flexural resonator elements 3a-3b, 3a'-3b' are kept in resonance according to the first flexural mode in the plane along the first axis x, by means of electrostatic interaction with the driving electrodes 12, 12' and, in the absence of an external angular velocity, have the same nominal flexural oscillation frequency $f_0$.

When the yaw angular velocity $\Omega_z$ is applied, as a result of the Coriolis forces $F_c$, the flexural resonator elements 3a-3b, 3a'-3b' are subjected to an axial action: in particular, two flexural resonator elements (for example, the flexural resonator elements 3a and 3b', denoted for simplicity in FIG. 2 by I and IV) are subjected to a compressive stress, whereas the other two flexural resonator elements (in the example, the flexural resonator elements 3b and 3a', denoted for simplicity in FIG. 2 with II and III) are subjected to a tensile stress of the same intensity, N:

$$N = \alpha \cdot \frac{F_c}{2} \tag{3}$$

where $\alpha$ is a force-amplification factor, which can be optimized by adjusting the point of constraint (c, c') of the flexural resonator elements 3a-3b, 3a'-3b' with respect to the corresponding elastic anchorage elements 8a-8b, 8a'-8b', as discussed previously.

Adopting the same notation used for designating the flexural resonator elements 3a-3b, 3a'-3b', the following expression consequently applies, linking the axial stresses perceived by the flexural resonator elements $$N_{II} = N_{III} = -N_I = -N_{IV} \tag{4}$$

Consequently, the frequency of oscillation of the flexural resonator elements subjected to compressive stress decreases, whereas the frequency of oscillation of the flexural resonator elements subjected to tensile stress increases, according to the relation $$f = f_0 \cdot \sqrt{1 + \gamma \frac{(\pm N) \cdot h^2}{E \cdot J}} \tag{5}$$

where $\gamma$ is a coefficient depending on the conditions of constraint, and h, J and E are respectively the length, the moment of inertia, and the elastic modulus of the flexural resonator element.

Combining the readings of the four flexural resonator elements 3a-3b, 3a'-3b', from Equation (5) linearized around the nominal flexural oscillation frequency $f_0$, the following expression (6) is obtained for the variation of flexural resonance frequency $\Delta f$, which is proportional to the external yaw angular velocity $\Omega_z$ $$f_{III} + f_{II} - f_I - f_{IV} \approx 2f_0\left(1 + \frac{1}{2}\gamma\alpha m\Omega_z \dot{x}\frac{h^2}{E \cdot J} - 1 + \frac{1}{2}\gamma\alpha m\Omega_z \dot{x}\frac{h^2}{E \cdot J}\right) \tag{6}$$

$$= 2f_0 \gamma\alpha m\Omega_z \dot{x}\frac{h^2}{E \cdot J}$$

With reference to FIGS. 3a and 3b, a description is now provided of the operation of the integrated detection structure 1 for detecting the roll angular velocity $\Omega_r$ about the second axis y, by means of the torsional resonator elements 4a-4b, 4a'-4b'.

When an external roll angular velocity $\Omega_r$ is applied, on the inertial masses 2, 2' two Coriolis forces originate, herein designated by $F_c'$ directed along the vertical axis z, of opposite direction and with the modulus given by $$F_c' = 2 \cdot m \cdot \Omega_r \cdot \dot{x} \tag{7}$$

as illustrated schematically in aforesaid FIGS. 3a, 3b.

As a result of these forces, the elastic anchorage elements 8a-8b, 8a'-8b' of the two inertial masses 2, 2' undergo torsional deformation, enabling rotation of the inertial masses about the respective axis of rotation A, A'. Given the arrangement of the inertial masses 2, 2' and of the axes of rotation A, A', the rotation occurs in the same direction (for example, counterclockwise) for both.

The torsional resonator elements 4a-4b, 4a'-4b' are fixedly constrained to the corresponding inertial mass 2, 2' in this movement of rotation (as a result of the characteristics of the corresponding elastic supporting elements 16, 16'), and hence undergo, as shown schematically in FIG. 3b, a corresponding displacement along the vertical axis z (note that in FIG. 3b, the torsional resonator elements 4a-4b, 4a'-4b' are shown in the resting condition, for simplicity of illustration, but it is understood that their oscillation of resonance is in any case present in a continuous manner).

In particular, a first resonator element, for example the first resonator element 4a (in the case of the first inertial mass 2, indicated for simplicity also by '1') and the second resonator element 4b' (in the case of the second inertial mass 2', here indicated for simplicity also by '4'), approach the substrate 20 (and the detection electrodes 18, 18' arranged thereon), whilst the other resonator element, in particular the second resonator element 4b (in the case of the first inertial mass 2, here indicated for simplicity by '2') and the first resonator element 4a' (in the case of the first inertial mass 2, here indicated for simplicity by '3'), move away from the same substrate 20 (and from the detection electrodes 18, 18' arranged thereon).

The nominal torsional resonance frequency $\varphi_0$ of the torsional resonator elements 4a-4b, 4a'-4b' may be expressed as follows $$\varphi_0 = \frac{1}{2\pi}\sqrt{\frac{K_m - K_e}{J_p}} \quad (8)$$

where $K_m$ is the rotational mechanical stiffness, $J_p$ is the polar moment of inertia of the resonant mass, and $K_e$ is the electrical torsional stiffness.

The latter, present due to the capacitive driving and inversely proportional to the cube of the distance between the electrodes, hence increases in the torsional resonator elements '1' and '4' and decreases in the torsional resonator elements '2' and '3'.

Consequently, the torsional resonance frequency $\phi_1$, $\phi_4$ of the torsional resonator elements '1' and '4' decreases, whereas the torsional resonance frequency $\phi_2$, $\phi_3$ of the torsional resonator elements '2' and '3' increases correspondingly.

By combining the readings of the four torsional resonator elements 4a-4b, 4a'-4b', the following expression is thus obtained for the variation of torsional resonance frequency $\Delta\phi$, which is proportional to the roll angular velocity $\Omega_r$:

$$\Delta\phi = \phi_2 - \phi_1 + \phi_3 - \phi_4 \quad (9)$$

The principle of operation of the integrated detection structure 1 as an accelerometer is now described.

Figure 4:
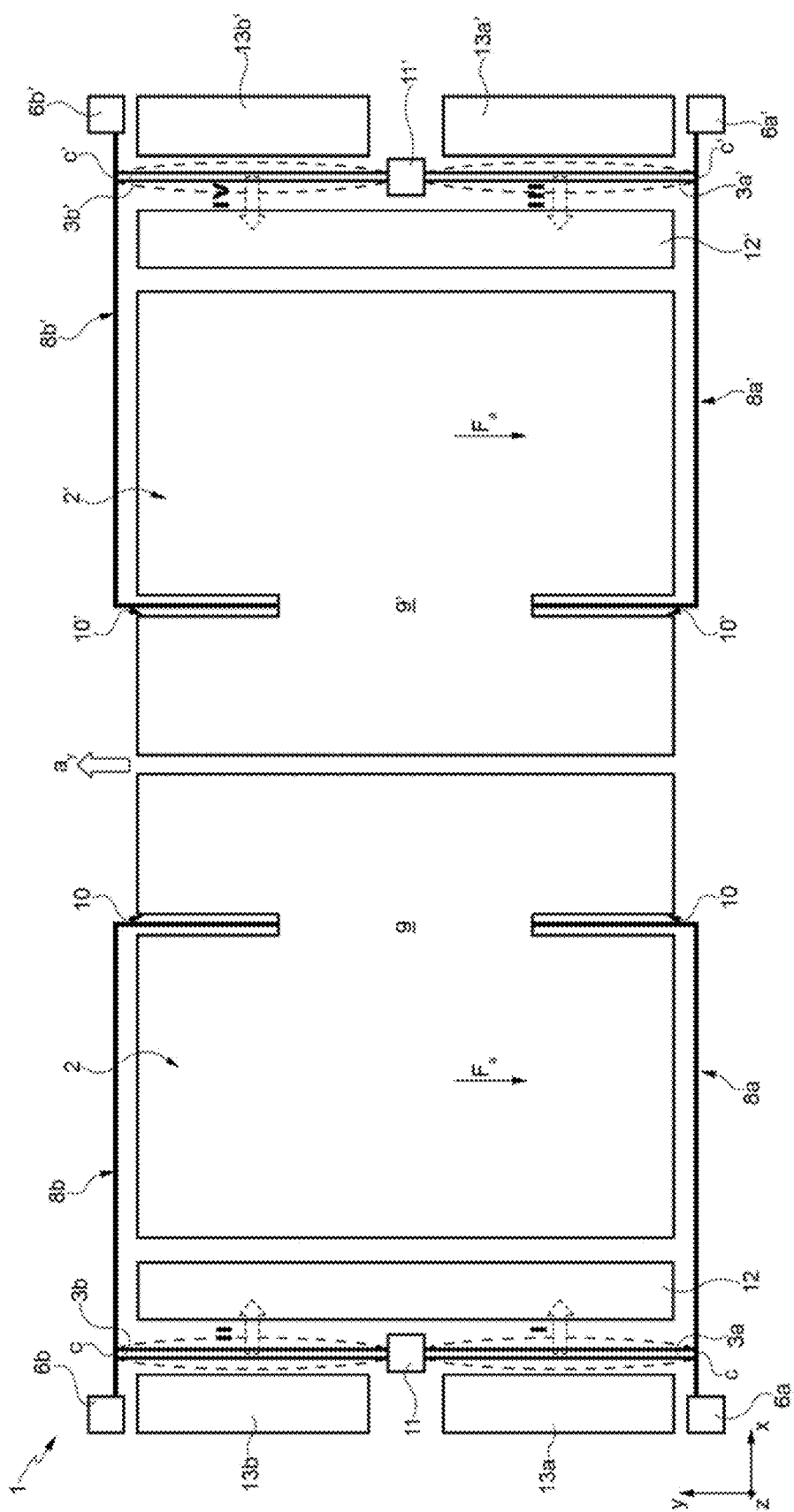
FIG. 4 shows a simplified plan view of the integrated detection structure in an operating condition of detection of an in-plane acceleration.

In the presence of an external linear acceleration $a_y$ along the second axis y, as shown schematically in FIG. 4 (in which once again the torsional resonator elements 4a-4b, 4a'-4b' are not represented for reasons of simplicity of illustration), the inertial masses 2, 2' are subjected to forces of inertia $F_a$ directed in one and the same direction of the second axis y, with the same sign, and with a modulus which is $$F_a = m \cdot a_y \quad (10)$$

As a result of the forces of inertia $F_a$, the flexural resonator elements 3a-3b, 3a'-3b' are again subjected to axial stresses, but in this case, unlike what occurs in the presence of the yaw angular velocity $\Omega_z$, these axial stresses are of the same sign (in the example of FIG. 4, they are tensile stresses) for the flexural resonator elements I and III, as they are of the same sign (in the example, they are compressive stresses) for the flexural resonator elements II and IV. The modulus of these stresses is moreover expressed as follows $$N = \alpha \cdot \frac{F_a}{2} \quad (11)$$

and the following expression that links the axial stresses perceived by the flexural resonator elements moreover applies:

$$N_I = N_{III} = -N_{II} = -N_{IV} \quad (12)$$

Combining the readings of the four flexural resonator elements 3a-3b, 3a'-3b', starting once again from Equation (5) linearized around the nominal flexural oscillation frequency $f_0$, the following expression (13) may in this case be obtained for the variation of flexural resonance frequency, here designated by $\Delta f'$, which is proportional to the linear acceleration $a_y$:

$$f_I + f_{III} - f_{II} - f_{IV} \approx 2f_0\left(1 + \frac{1}{4}\gamma\alpha m a_y \frac{h^2}{E \cdot J} - 1 + \frac{1}{4}\gamma\alpha m a_y \frac{h^2}{E \cdot J}\right) \quad (13)$$

$$= f_0 \gamma\alpha m a_y \frac{h^2}{E \cdot J}$$

It may thus be noted that, via a different combination of the quantities supplied by the same flexural resonator elements 3a-3b, 3a'-3b', it is possible to detect both of the external quantities, the yaw angular velocity $\Omega_z$, and the linear acceleration $a_y$ along the second axis y. In fact, different displacements of the resonance frequency in the flexural resonator elements of at least one pair occur, according to the presence of the yaw angular velocity $\Omega_z$ or of the linear acceleration $a_y$.

For detection of the linear acceleration $a_z$ acting along the vertical axis z, the torsional resonator elements 4a-4b, 4a'-4b' are used, in a way similar to what has been described for detection of the roll angular velocity $\Omega_r$.

Figure 5A:
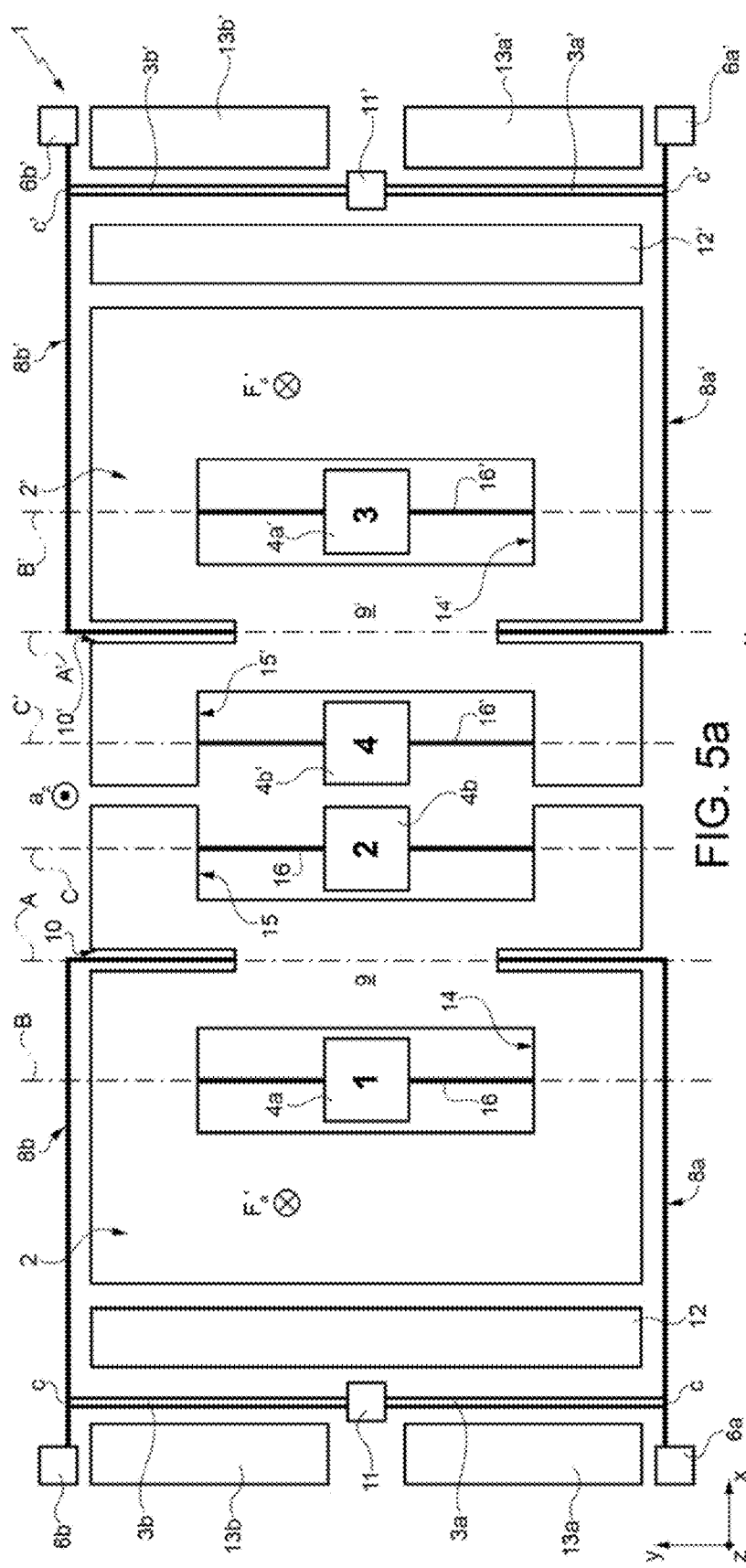
FIGS. 5a-5b show, in plan view and, respectively, in lateral section, the integrated detection structure in an operating condition of detection of an out-of-plane acceleration.
Figure 5B:
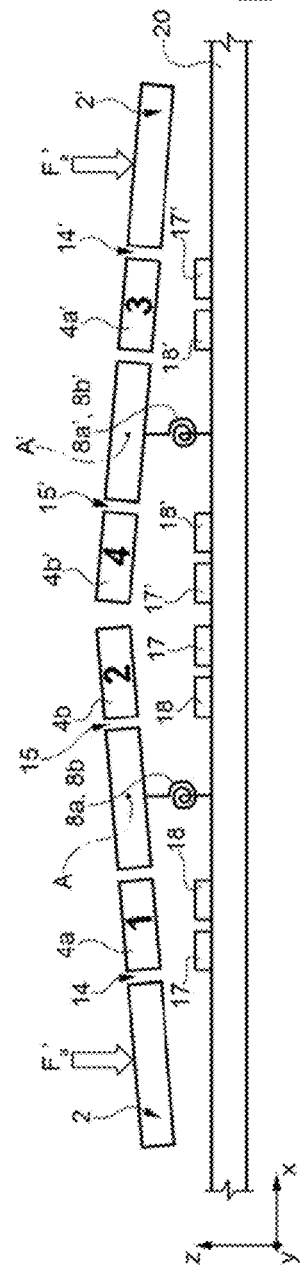

In detail, in the presence of the linear acceleration $a_z$, as shown schematically in FIGS. 5a, 5b, two forces of inertia originate on the two inertial masses 2, 2', here designated by $F_a'$, directed along the vertical axis z, which have in this case the same direction.

As a result of these forces of inertia $F_a'$, the inertial masses 2, 2' rotate about the respective axes of rotation A, A', one in a counterclockwise direction (in the example of FIG. 5a, the first inertial mass 2), and the other in the clockwise direction (in the example, the second inertial mass 2').

In this case, therefore, variations of frequency of the same sign occur in the torsional resonator elements '1' and '3', and in the torsional resonator elements '2' and '4'.

Combining the readings of the four torsional resonator elements 4a-4b, 4a'-4b', the following expression is thus obtained for the variation of torsional resonance frequency, here designated by $\Delta\phi'$, which is proportional to the linear acceleration $a_z$, the value of which is to be detected:

$$\Delta\phi' = \phi_2 - \phi_1 + \phi_4 - \phi_3 \quad (14)$$

Accordingly, it may once again be noted that, via a different combination of the quantities supplied by the same torsional resonator elements 4a-4b, 4a'-4b', it is possible to detect both of the external quantities, the roll angular velocity $\Omega_r$, and the linear acceleration $a_z$ along the vertical axis z.

Figure 6:
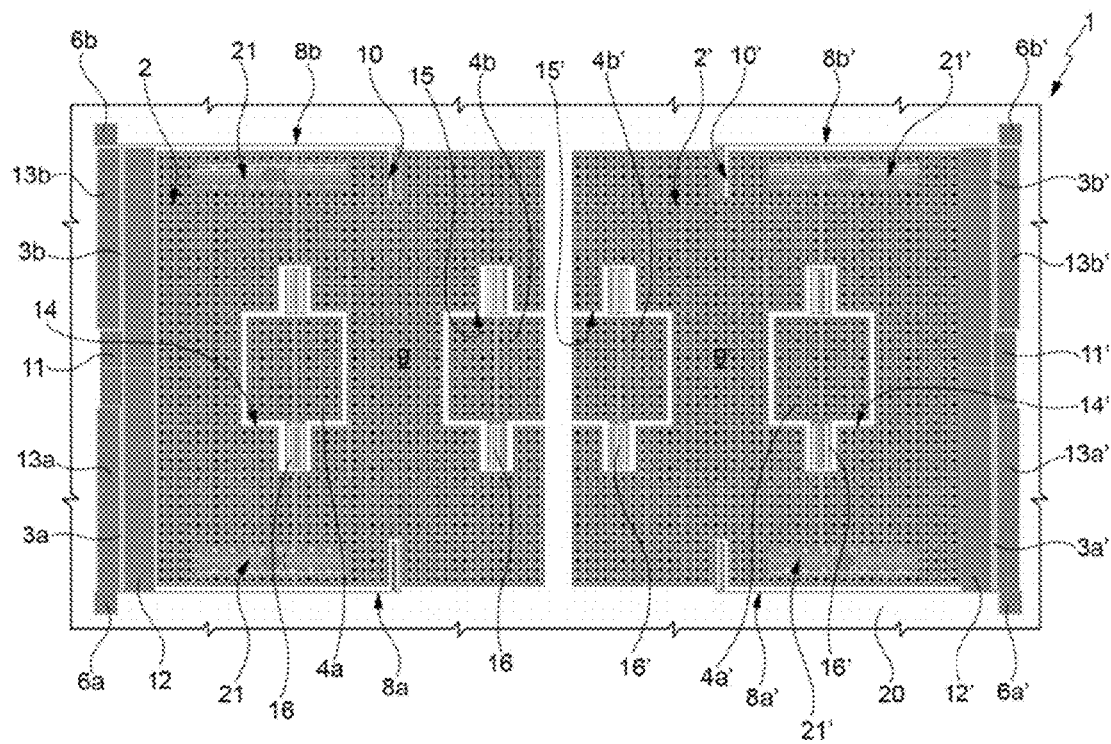
FIG. 6 is a more detailed plan view of an embodiment of the integrated detection structure.

FIG. 6 illustrates a more detailed top plan view (so-called "layout") of an embodiment of the integrated detection structure, once again designated by 1, in which it may be noted, amongst other features, the presence of holes made through the entire thickness of the inertial masses 2, 2' and of the torsional resonator elements 4a-4b, 4a'-4b', in order to enable their release with respect to the substrate 20 by chemical etching of underlying regions of material.

Stopper elements 21, 21' may also be noted, arranged within the inertial masses 2, 2', for limiting the spurious movements of the same inertial masses 2, 2' in the horizontal plane xy and moreover along the vertical axis z. These stoppers 21, 21' are conveniently anchored to the substrate 20 and are able to stop the movement of the inertial masses 2, 2' prior to possible damage.

In the integrated detection structure 1 shown in FIG. 6, with a size of the two inertial masses 2, 2' of approximately 420 µm×470 µm×22 µm and a biasing voltage of 6 V, the sensitivity as accelerometer in both of the directions y and z is higher than 350 Hz/g, whilst the sensitivity as (roll and yaw) gyroscope is approximately 0.15 Hz/°/s.

Figure 7:
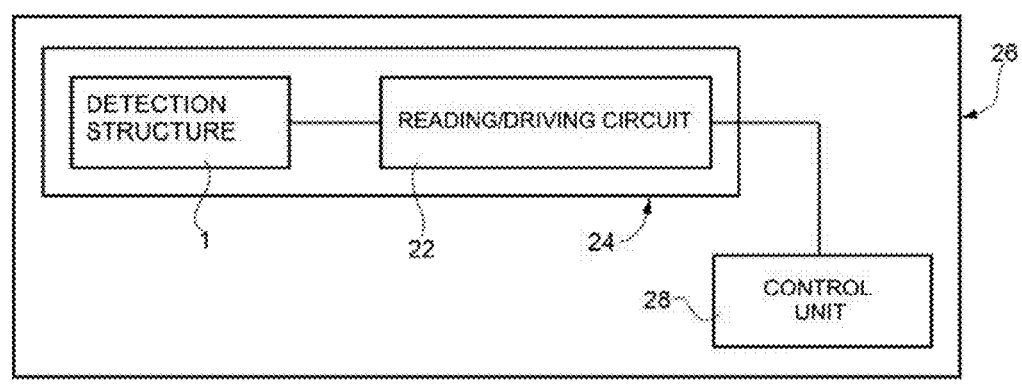
FIG. 7 is a simplified block diagram of a MEMS sensor device, in an electronic apparatus, incorporating the integrated detection structure.

As shown in FIG. 7, the integrated detection structure 1 is conveniently coupled to an appropriate reading and driving electronic circuit 22, configured, amongst other features, in such a way as to carry out appropriate processing operations and combinations of the values of flexural resonance frequency $f_I$-$f_{IV}$ and of the values of torsional resonance frequency $\phi_1$-$\phi_4$ (in particular, the different combinations of these values described previously in detail for obtaining the variations of flexural and torsional resonance frequency, $\Delta f$-$\Delta f'$, $\Delta\phi$-$\Delta\phi'$), in order to determine the value of the external quantities of acceleration and angular velocity to be detected.

The integrated detection structure 1 and the associated reading and driving electronic circuit 22 form together a resonant sensor device 24, provided with two acceleration measurement axes and two angular-velocity measurement axes; the electronic reading circuit 22 is conveniently provided in the integrated form as ASIC (Application-Specific Integrated Circuit), in a die that may be advantageously housed in one and the same package that houses also the die in which the integrated detection structure 1 is provided.

As shown schematically in the same FIG. 7, an electronic apparatus 26, provided with the resonant sensor device 24, for example, a portable apparatus, such as a mobile phone, a smartphone, a laptop, a palmtop, a tablet, a photographic camera or a video camera, further comprises a control unit 28 (for example a microprocessor control unit), electrically connected to the reading and driving electronic circuit 22 so as to receive the measurements of the external quantities of acceleration and angular velocity detected, for carrying out control operations for the management of the electronic apparatus 26.

As mentioned previously, the integrated detection structure 1 may be obtained with surface-micromachining processes, for example, using the so-called ThELMA (Thick Epipoly Layer for Microactuators and Accelerometers) process.

The ThELMA process makes it possible to obtain suspended structures with relatively small thicknesses (for example, in the region of 15-25 µm), anchored to the substrate through compliant parts (springs) and consequently able to displace with respect to the underlying silicon substrate. The process consists of various manufacturing steps, amongst which:

thermal oxidation of the substrate;

deposition and patterning of horizontal electrical interconnections (that are, for example, designed to form the electrodes 17, 18 and the associated electrical paths);

deposition and patterning of a sacrificial layer;

epitaxial growth of a structural layer (for example, made of polysilicon with a thickness of 22 µm, for formation of the suspended masses);

patterning of the structural layer by means of trench etching;

removal of the sacrificial oxide for release of the various suspended masses; and deposition of contact metallizations.

From what has been described and illustrated previously, the advantages that the present solution affords are evident.

In particular, it is underlined that the integrated detection structure 1 described, although using just two inertial masses 2, 2', enables independent reading of two components of acceleration and of two components of velocity of rotation with a considerable saving in terms of overall dimensions.

The structure is, for all four external stresses, fully differential, given that in any case, one first resonator element, whether flexural or torsional, of each pair, undergoes an increase in resonance frequency and the other resonator element, whether flexural or torsional, of the same pair undergoes a corresponding decrease in resonance frequency. The differential reading advantageously enables detection of the external quantities even in the presence of a state due to restraint, generated, for example, by a thermal variation that might induce a non-planarity of the structure. Moreover, the differential reading increases, in a known way, the range of linearity and the sensitivity in the detection of the external quantities.

The geometrical configuration proposed, in particular the position of the flexural resonator elements 3a-3b, 3a'-3b' with respect to the respective inertial mass 2, 2', and the position of the torsional resonator elements 4a-4b, 4a'-4b', which rotate about axes of rotation B-B', C-C' parallel to the axis of rotation A of the same inertial mass, enables reduction of the overall dimensions of the integrated detection structure 1.

Moreover, the position of the flexural resonator elements 3a-3b, 3a'-3b' enables their resonant driving by means of the same driving electrodes 12, 12' as the ones used for driving the two inertial masses 2, 2', once again to the advantage of reduction in the overall dimensions.

In general, the use in one and the same integrated detection structure 1 of two different principles for variation of resonance frequency, i.e., the dependence of the resonance frequency upon the axial action in the resonators and upon the electrical stiffness to which the same resonators are subjected, makes it possible to provide an accelerometer and a resonant gyroscope with the surface micromachining technology, for simultaneous detection of accelerations in the horizontal plane xy and out of the same plane, and angular velocities of yaw and roll.

In conclusion, it is clear that modifications and variations may be made to what has been described and illustrated herein, without thereby departing from the scope of the present disclosure.

In particular, a variant embodiment of the integrated detection structure 1 could possibly envisage the presence, for example, of just the torsional resonator elements 4a-4b, 4a'-4b', in the case where it is desired to detect only a first component of linear acceleration in combination with a first angular velocity, exploiting the principle of variation of the electrical stiffness perceived by the torsional resonator elements for detecting both of the quantities. Likewise, yet another variant could envisage the presence of just the flexural resonator elements 3a-3b, 3a'-3b', in the case where a single component of linear in-plane acceleration and the yaw angular velocity is to be detected.

Moreover, the geometrical shape of the integrated detection structure 1, or of parts thereof, could differ from what has been described previously, without this entailing relevant variations in the operating principle.

The integrated detection structure 1 could be of a nanoelectromechanical type, in the case of use of adequate methods of fabrication that may enable submicrometric dimensions to be reached.

Figure 8:
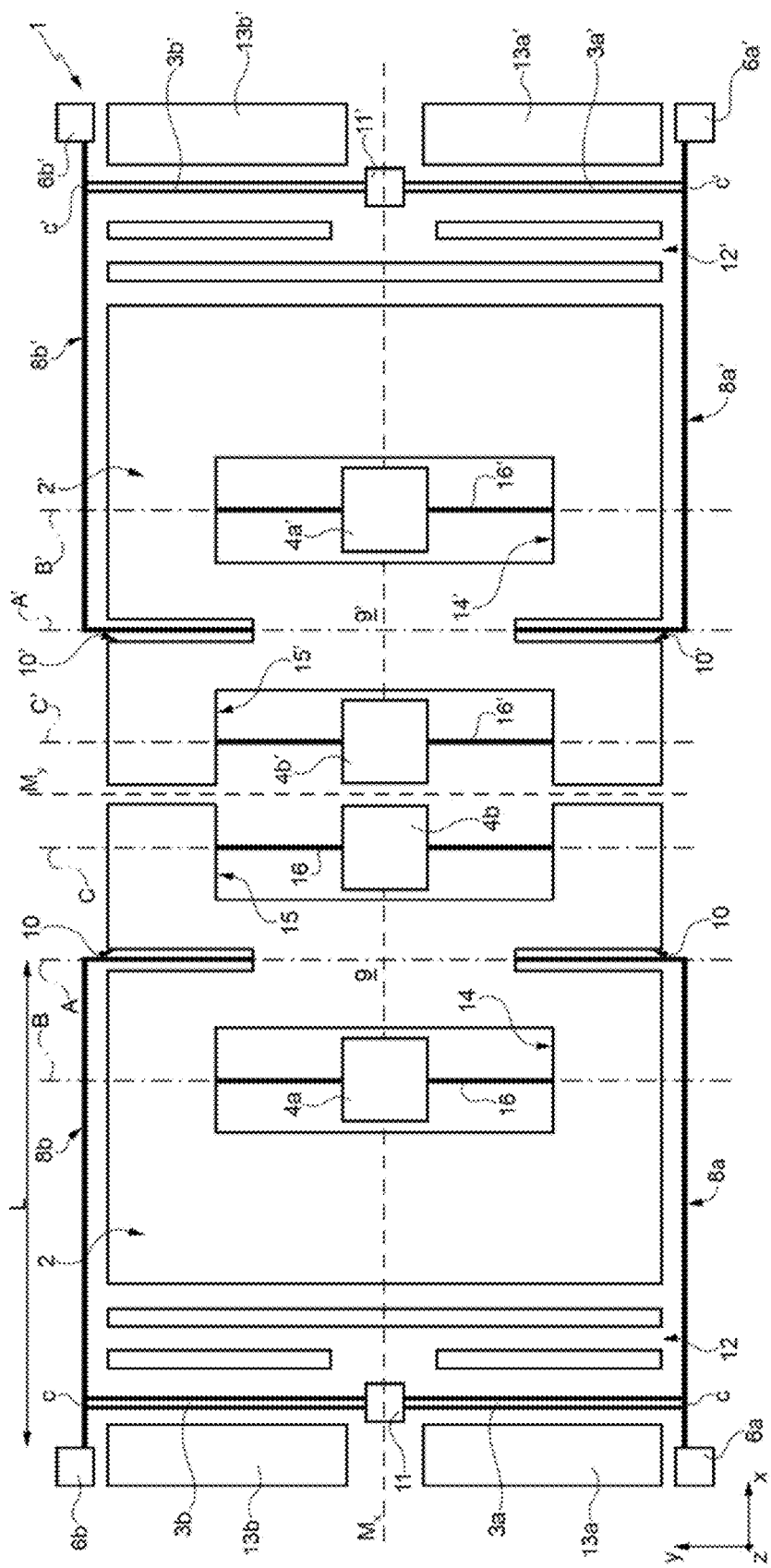
FIG. 8 is a schematic plan view of an integrated detection structure, according to a further alternative embodiment.

As illustrated in FIG. 8, splitting into two of the driving electrodes 12, 12' could moreover be envisaged, envisaging distinct driving electrodes for driving the flexural resonator elements 3a-3a', 3b-3b', and for driving the respective inertial mass 2, 2'.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated detection structure comprising:
a substrate;
first elastic anchorage elements;
second elastic anchorage elements;
a first inertial mass suspended over the substrate in a plane and anchored to the substrate by the first elastic anchorage elements;
a second inertial mass suspended over the substrate in the plane and anchored to the substrate by the second elastic anchorage elements;
a first set of driving electrodes operatively coupled to each of said first and second inertial masses and configured to drive the first and second inertial masses with driving movements, in opposite directions along a first axis of said plane; and
first, second, third, and fourth elastic supporting elements;
a first pair of first resonator elements elastically coupled to said first inertial mass by the first and second elastic supporting elements, respectively, said first and second elastic supporting elements being configured to enable independent resonant movements of the first resonator elements of the first pair with respect to each other;
a second pair of first resonator element elastically coupled to said second inertial mass by the third and fourth elastic supporting elements, respectively, said third and fourth elastic supporting elements being configured to enable independent resonant movements of the first resonator elements of the second pair with respect to each other; wherein:
said first elastic anchorage elements are configured to allow the first inertial mass to perform a first linear driving movement along the first axis in said plane, allow a first detection movement of rotation about a first rotation axis parallel to a second axis transverse to said first axis and in said plane as a function of a first angular velocity or a first linear acceleration to be detected and cause corresponding variations of resonance frequency of said first pair first resonator elements; and
said second elastic anchorage elements are configured to allow the second inertial mass to perform a second linear driving movement along the first axis in said plane, allow a second detection movement of rotation about a second rotation axis parallel to the second axis in said plane as a function of the first angular velocity or the first linear acceleration to be detected and cause a corresponding variations of resonance frequency of said second pair of first resonator elements.

2. The structure according to claim 1, wherein:
said first resonator elements of said first and second pairs of first resonator elements are of a torsional type, and said independent resonant movement of each of said first and second pairs is an independent movement of rotation of the first resonator elements about a respective second axis of rotation and third axis of rotation that are parallel to one another and parallel to the respective first axis of rotation of said first and second inertial masses;
said respective first detection movement for said first and second inertial masses is the same direction of rotation, as a result of a respective Coriolis force, in response to a first angular velocity about said second axis, and in opposite directions of rotation, as a result of a respective inertial force, in response to a first linear acceleration directed along a vertical axis transverse to said plane.

3. The structure according to claim 2, comprising a first set of detection electrodes arranged on said substrate and operatively coupled to said first resonator elements to enable detection of corresponding variations of resonance frequency as the electrical stiffness varies as a function of a variation of distance from said substrate as a result of said first detection movement of said first and second inertial masses.

4. The structure according to claim 3, wherein said respective first detection movement of said first and second inertial masses is configured to cause opposite variations of distance from said substrate, in the first resonator elements of first and second pairs, and different variations of resonance frequency in the first resonator elements of at least one of the first and second pairs in response to said first angular velocity or of said first linear acceleration.

5. The structure according to claim 2, wherein:
the first resonator elements of said first and second pairs are arranged in a first opening and in a second opening, respectively, provided in the respective inertial mass; and
said first opening and said second opening are set symmetrically with respect to said first axis of rotation, said second opening being open towards an outside of the respective inertial mass, centrally with respect to said integrated detection structure.

6. The structure according to claim 5, wherein said first resonator elements are contained in overall dimensions of the respective inertial mass in said plane and are set symmetrically with respect to said first axis of rotation, said second axis of rotation and said third axis of rotation being arranged at a same distance from said first axis of rotation.

7. The structure according claim 2, further comprising a second set of driving electrodes operatively coupled to said first resonator elements and configured to cause driving thereof, in a resonance condition, in rotation about said second axis of rotation and said third axis of rotation, respectively, at a nominal torsional resonance frequency.

8. The structure according to claim 1, further comprising a median axis parallel to the second axis; wherein said first and second inertial masses are arranged symmetrically with respect to said median axis.

9. The structure according to claim 1, wherein:
the respective first and second elastic anchorage elements couple said first and second inertial masses to respective external anchorages; and
said first and second inertial masses have a distribution of mass that is asymmetrical with respect to said respective first axis of rotation, and are constrained in an eccentric way to said substrate via the respective elastic anchorage elements.

10. The structure according to claim 9, wherein said first resonator elements of the first and second pairs are of a torsional type; the structure further comprising first and second pairs of second resonator elements of a flexural type, the first and second pairs of second resonator elements coupled to each of said first and second inertial masses, each of said second resonator elements having a first end constrained to an anchorage towards said substrate and a second end constrained to a respective one of said elastic anchorage elements, in the proximity of a respective one of said external anchorages; wherein said elastic anchorage elements are further configured to allow the respective inertial mass to perform a respective second linear detection movement along said second axis; said respective second detection movement being designed to cause axial stresses in said second resonator elements and vary the resonance frequency.

11. The structure according to claim 10, further comprising a second set of detection electrodes operatively coupled to said second resonator elements and enable detection of corresponding variations of resonance frequency.

12. The structure according to claim 10, wherein said respective second detection movement for said first and second inertial masses is in the same direction of said second axis in response to a second linear acceleration directed along said second axis, and in opposite directions of said second axis in the presence of a second angular velocity about said vertical axis.

13. The structure according to claim 12, wherein the structure is configured to enable joint detection of said first linear acceleration and said second linear acceleration directed along said vertical axis and said second axis, respectively, and of said first angular velocity and said second angular velocity about said second axis and said vertical axis, respectively.

14. The structure according to claim 12, wherein said respective second detection movement of said inertial masses is configured to cause opposite axial stresses in the second resonator elements of the first and second pairs and different variations of resonance frequency of the second resonator elements of at least one pair in response to the presence of said second angular velocity or of said second linear acceleration.

15. The structure according to any one of claim 10, wherein said first set of driving electrodes is further configured to cause resonant driving of said second resonator elements at a nominal flexural resonance frequency thereof.

16. The structure according to claim 15, wherein:
said second resonator elements are beam-shaped and have a longitudinal extension along said second axis; and
said first set of driving electrodes comprises a respective driving electrode arranged laterally with respect to a respective one of said first and second inertial masses and facing a respective pair of said first resonator elements and set along said first axis between said respective first and second pairs of second resonator elements and the respective inertial mass.

17. A resonant sensor device comprising:
an integrated detection structure including:
　a substrate;
　first elastic anchorage elements;
　second elastic anchorage elements;
　a first inertial mass suspended over the substrate in a plane and anchored to the substrate by the first elastic anchorage elements;
　a second inertial mass suspended over the substrate in the plane and anchored to the substrate by the second elastic anchorage elements;
　a first set of driving electrodes operatively coupled to each of said first and second inertial masses and configured to drive the first and second inertial masses with driving movements, in opposite directions along a first axis of said plane; and
　first, second, third, and fourth elastic supporting elements;
　a first pair of first resonator elements elastically coupled to said first inertial mass by the first and second elastic supporting elements, respectively, said first and second elastic supporting elements being configured to enable independent resonant movements of the first resonator elements of the first pair with respect to each other;
　a second pair of first resonator element elastically coupled to said second inertial mass by the third and fourth elastic supporting elements, respectively, said third and fourth elastic supporting elements being configured to enable independent resonant movements of the first resonator elements of the second pair with respect to each other; wherein:
　said first elastic anchorage elements are configured to allow the first inertial mass to perform a first linear driving movement along the first axis in said plane, allow a first detection movement of rotation about a first rotation axis parallel to a second axis transverse to said first axis and in said plane as a function of a first angular velocity or a first linear acceleration to be detected and cause corresponding variations of resonance frequency of said first pair first resonator elements; and
　said second elastic anchorage elements are configured to allow the second inertial mass to perform a second linear driving movement along the first axis in said plane, allow a second detection movement of rotation about a second rotation axis parallel to the second axis in said plane as a function of the first angular velocity or the first linear acceleration to be detected and cause a corresponding variations of resonance frequency of said second pair of first resonator elements; and
a reading and driving circuit electrically coupled to said integrated detection structure and configured to jointly detect the values of at least one first angular velocity and of at least one first linear acceleration as a function of respective combinations of variations of resonance frequency of said first resonator elements as a result of the respective first detection movement of said inertial masses.

18. An electronic apparatus, comprising:
a resonant sensor device according to claim 17; and
a control unit electrically coupled to said reading and driving circuit of said resonant sensor device and configured to receive detected values of said at least one first angular velocity and said at least one first linear acceleration.

* * * * *